Patented Aug. 5, 1952

2,606,170

UNITED STATES PATENT OFFICE 2,606,170

POLYVINYL ALDEHYDE AND POLYVINYL ACETATE RESINS PLASTICIZED WITH 1,5-PENTANEDIOL BIS-CYCLOHEXYLACETATE

Stanford J. Hetzel, Cheltenham, Pa., assignor to Sun Oil Company, Philadelphia, Pa., a corporation of New Jersey No Drawing. Application December 30, 1949, Serial No. 136,142

4 Claims. (Cl. 260—31.6)

This invention relates to plasticized polyvinyl aldehyde and polyvinyl acetate resin compositions, and to the use of 1,5-pentanediol bis-cyclohexylacetate as plasticizer in such compositions.

1,5-pentanediol bis-cyclohexylacetate is disclosed and claimed in applicant's copending application Serial No. 46,182, filed August 25, 1948, now U. S. Patent 2,500,033, issued March 7, 1950. The product therein described is a colorless to amber oil-like material having a boiling point at 5 mm. Hg of about 210° C.–216° C., a refractive index $N_D^{20° C.}$ of 1.4726, and a density of $D_4^{20° C.}$ of 1.0073. Polyvinyl chloride resins plasticized with 1,5-pentanediol bis-cyclohexylacetate are disclosed and claimed in applicant's copending application Serial No. 46,187, filed August 25, 1948, now U. S. Patent 2,504,929 issued April 18, 1950.

According to the present invention, 1,5-pentanediol bis-cyclohexylacetate is compounded with a resin selected from the group consisting of polyvinyl acetal, polyvinyl butyral, and polyvinyl acetate resins to form a composition comprising the resin plasticized with 1,5-pentanediol bis-cyclohexylacetate.

The following examples illustrate the invention:

Example I 80 parts by weight of resin, known commercially as Vinylite AYAF and consisting essentially of polyvinyl acetate, were fused on a 3″ x 8″ rubber mill, whose rolls were heated to 220–230° F. About 20 parts of 1,5-pentanediol bis-cyclohexylacetate as plasticizer and about 1 part of magnesium stearate as lubricant were added to the fused resin. The resin and ester blended to form a homogeneous mixture. The mixture was sheeted off at 175–190° F. to give a plastic sheet having satisfactory tensile strength, odor, and appearance, and flexibility substantially increased over that of the unplasticized resin.

Example II 40 parts by weight of a polyvinyl butyral resin known commercially as Vinylite XYSG were mixed together with about 60 parts by weight of 1,5-pentanediol bis-cyclohexylacetate and about 1 part of magnesium stearate. The mixture was then fused on a 3″ x 8″ rubber mill whose rolls were heated to about 250° F. The resin and ester blended to form a homogeneous mixture. The mixture sheeted off to give a plastic sheet having increased flexibility and satisfactory tensile strength, odor and appearance.

The above examples show that 1,5-pentanediol dibenzoate, in proportion sufficient to plasticize the resin, is compatible with polyvinyl acetate and polyvinyl butyral resin. The ester and resin may be compounded according to methods as practiced in the arts relating to the respective resins.

Polyvinyl acetal and polyvinyl butyral resins, where referred to in the present specification, are intended to indicate resinous materials obtained by reacting hydrolyzed polyvinyl acetate resin with acetaldehyde and butyraldehyde respectively in the manner well known in the art for preparation of such polyvinyl aldehyde resins, the ratio of the acetal portion of such resinous materials to the unconverted acetyl and hydroxyl portions thereof being of substantial magnitude and generally at least about one.

I claim:

1. A composition comprising a resin selected from the group consisting of polyvinyl acetal, polyvinyl butyral, and polyvinyl acetate resins, said resin plasticized with 1,5-pentanediol bis-cyclohexylacetate.

2. Composition according to claim 1 wherein said resin is a polyvinyl butyral resin.

3. Composition according to claim 1 wherein said resin is a polyvinyl acetate resin.

4. Composition according to claim 1 wherein said resin is a polyvinyl acetal resin.

STANFORD J. HETZEL.

REFERENCES CITED

The following references are of record in the file of this patent:

UNITED STATES PATENTS

| Number | Name | Date |
|---|---|---|
| 2,339,387 | Endres | Jan. 18, 1944 |
| 2,504,929 | Hetzel | Apr. 18, 1950 |